Aug. 25, 1942. P. M. SALERNI 2,293,765
HYDRAULIC POWER TRANSMISSION APPARATUS
Filed April 5, 1938 3 Sheets-Sheet 1
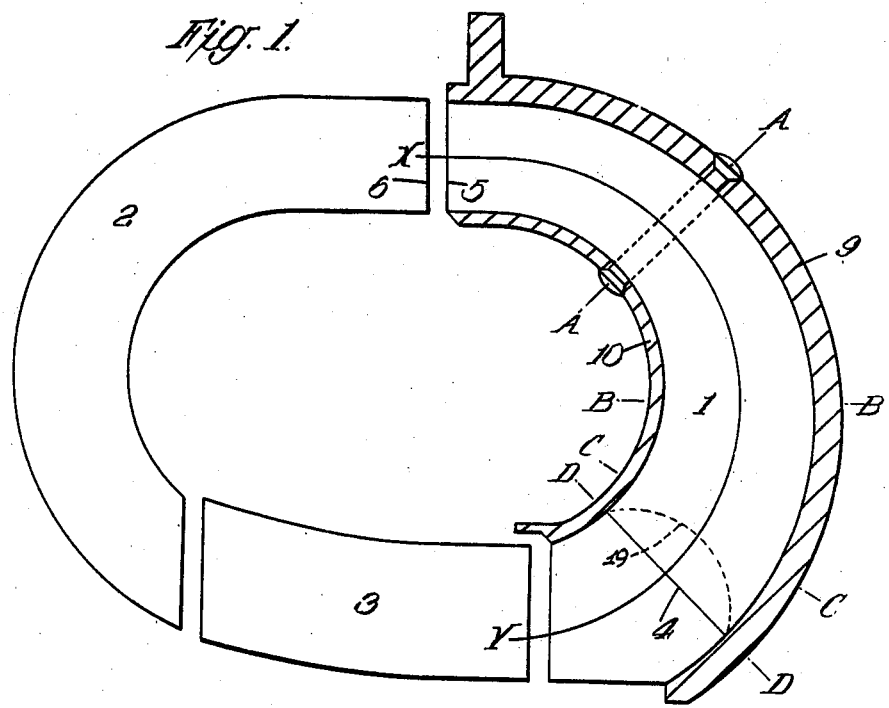
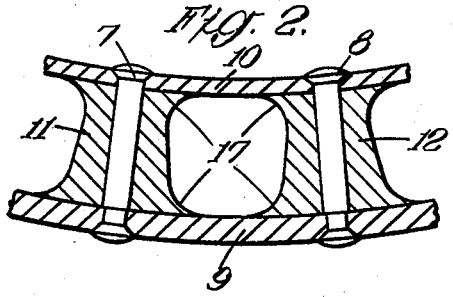
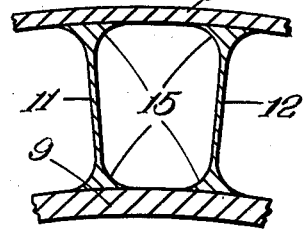
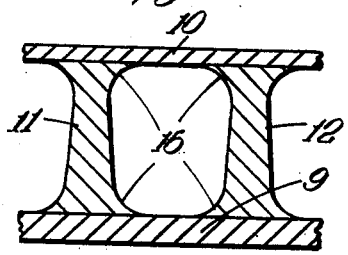
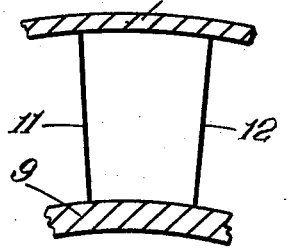
INVENTOR:
PIERO MARIANO SALERNI
By Haseltine, Lake & Co.
ATTORNEYS

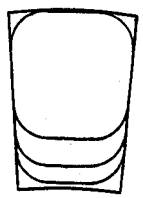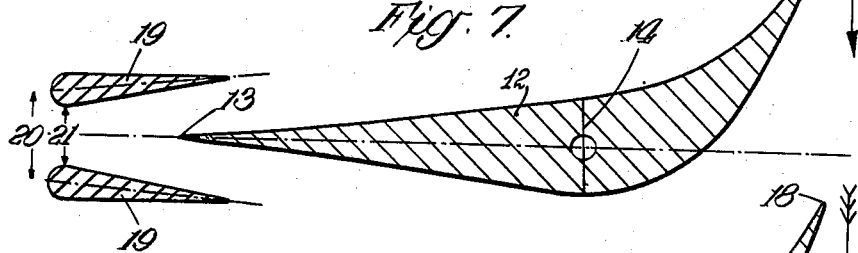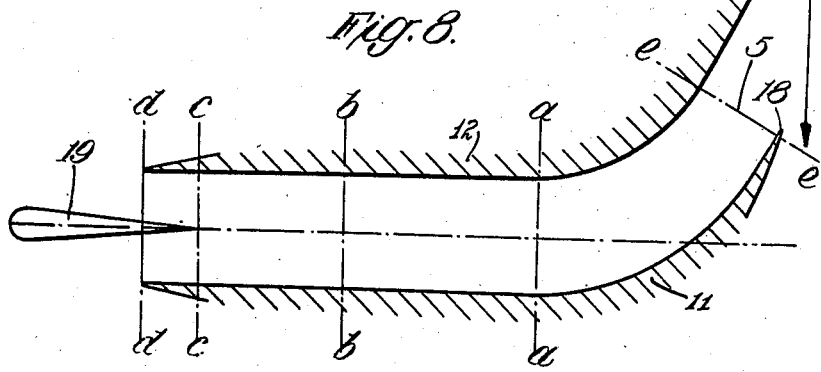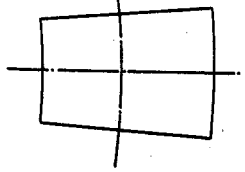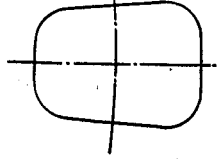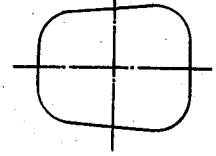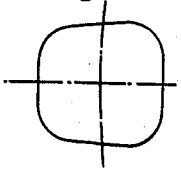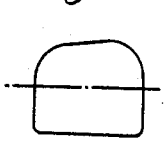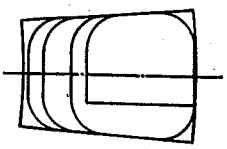

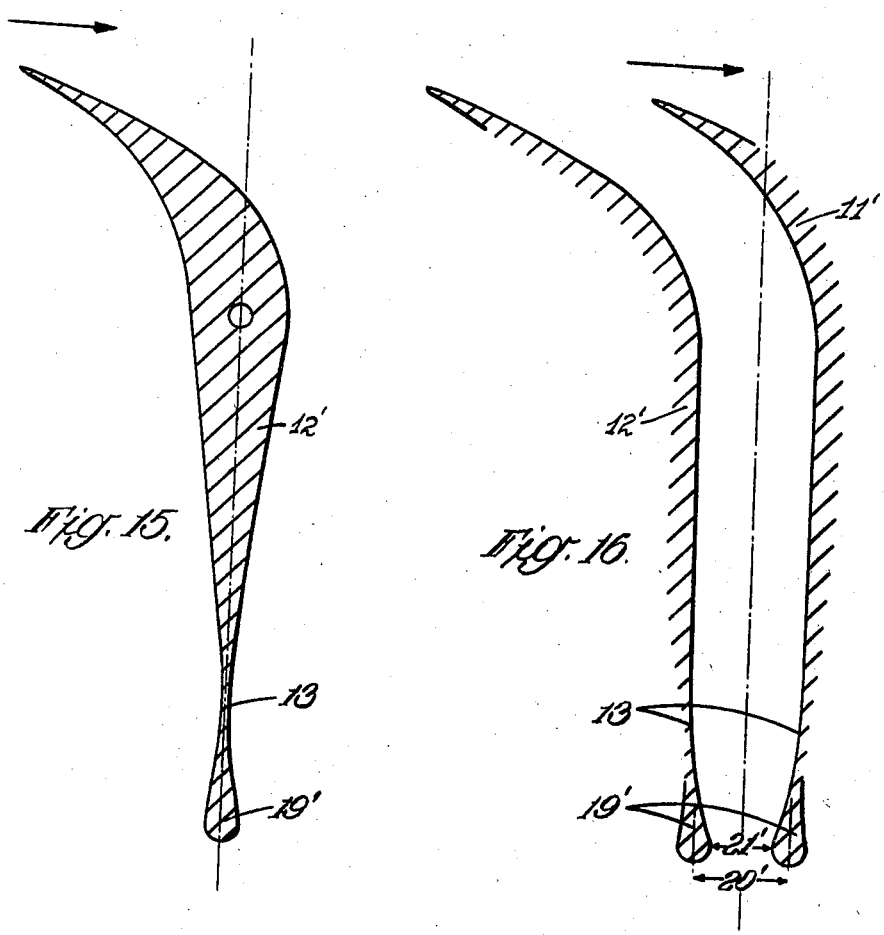

Patented Aug. 25, 1942

2,293,765

UNITED STATES PATENT OFFICE 2,293,765

HYDRAULIC POWER TRANSMISSION APPARATUS

Piero Mariano Salerni, Westminster, London, England, assignor to Marie Thérèse Elisabeth Salerni, Nice, France Application April 5, 1938, Serial No. 200,136
In Great Britain April 8, 1937

6 Claims. (Cl. 60—54)

This invention relates to hydraulic power transmission apparatus of the variable speed kind in which an impeller or driving member having ducts between vanes drives a turbine or driven member by means of liquid, and in which the torque imparted by hydraulic means to the turbine is or can be substantially greater than that imparted to the impeller whereby transmission of power may be effected by hydraulic means at a torque ratio or ratios substantially greater than the ratio of 1 to 1 independently of any associated mechanical change speed gearing. This invention is concerned with the design of the impeller.

According to this invention the impeller has ducts, whose outlets are situated in the outer part of the circuit (i. e., in that part of the circuit in which the direction of flow has an axial component and which is more remote from the axis of rotation than the parts wherein the direction of flow is radial) and of which ducts at least a substantial part is non-divergent (i. e., throughout that part any normal cross section thereof can be superimposed upon every normal cross section thereof which is more remote than itself from the outlet without overlapping the same).

Such a construction gives increased efficiency of transmission and it is believed that the reason is that eddying and turbulence are thereby diminished. The greater the length of the non-divergent part of each duct, the higher will be the efficiency, and in any case such part must be substantial, i. e., long enough to give, in any particular apparatus, the required degree of efficiency.

Preferably the ducts of the impeller are made non-divergent up to or nearly up to the outlet and preferably from a point at or near the inlet, and preferably the cross sectional area is progressively reduced throughout such length.

The cross sectional area may be made to decrease in the case of a tetragonal duct either by causing both pairs of opposite walls to converge or by keeping one pair parallel and causing the other pair to converge. If the liquid used has a high viscosity, e. g., as in the case of common engine lubricating oil, if one pair of opposite walls has a convergence of 5° while the other pair remains parallel, a substantial advantage is obtained. Up to a limit (which is at least 15°) the greater the degree of convergence the better will be the result.

The construction of the apparatus itself imposes limits to the possible amount by which the cross sectional area can be reduced towards the outlet. Thus the outlet must not be unduly constricted as otherwise the liquid will not be able to circulate sufficiently freely to transmit power efficiently. Moreover, the permissible maximum size or cross section of the inlet is limited by considerations of the design of the circuit, since there must not be inordinate discrepancies in size between the dimensions of the channel through which the liquid is delivered to the impeller and the inlet of the impeller.

In the preferred construction the ducts have their outlets at the part of the circuit farthest away from the axis of rotation, so that the liquid issues therefrom in a direction having no radial component. In the preferred construction the ducts extend throughout practically the full radial dimension of the circuit and are curved also towards the inlet. The radius of the outside curve preferably at no point exceeds about twice the radius of the inner curve as otherwise there might be a tendency to eddying and turbulence from this cause. This requirement also, therefore, imposes a limit on the permissible maximum size or cross section of the inlet.

The reduction of cross-sectional area towards the outlet is preferably as great as possible consistent with the above considerations.

The inlet and outlet of each duct are preferably substantially tetragonal, but from the inlet towards the middle portion of the duct the corners are preferably progressively rounded and the duct is preferably made again progressively to approach the tetragonal form towards its outlet.

Of the non-divergent part of each duct that portion which lies nearer to the inlet can be made non-divergent by progressively thickening the vanes of the impeller (i. e., the parts forming the walls separating a duct from adjoining ducts) in the direction towards the outlet. The vanes can be made integral with the impeller but it is convenient to make them separately and to assemble them upon the body of the impeller. Preferably the cross-sectional area is simultaneously progressively reduced and preferably this is accomplished by causing the remaining walls of the duct to converge.

It is preferred to form the outlet of each duct in such a manner that the stream issuing from a duct becomes merged gradually with those issuing from the adjoining ducts without objectionable eddying or turbulence. In order to achieve this the thickness of the vanes must be progressively decreased towards the outlet. This can be accomplished, while maintaining non-divergence, by turning or curving the vanes as they approach the outlet. The turn must be backwards relative to the direction of rotation. Preferably this backwards turn takes place only in that portion of each duct of the impeller which lies in the outer part of the circuit and preferably in that portion the turn is sufficient to cause the walls constituted by the vanes to converge. Preferably the vanes are radially disposed elsewhere. It will be understood that the extent to which the vanes are turned backwards must not be so great that power is no longer efficiently transmitted (the optimum angle to which the vanes are turned relative to the direction of rotation usually lies between 30° and 60°). Hence, if the vanes are turned backwardly any distance before they approach the outlet of the ducts, the extent and opportunity of turning or curving the vanes backward will be correspondingly reduced, since the thickness of the vanes can only be reduced or eliminated without divergence by further backward turning.

The accompanying drawings show a typical embodiment of the invention.

Figure 1 is a side view of the liquid circuit.

Figures 2, 3, 4 and 5 are cross-sections of a duct on the lines of A—A, B—B, C—C and D—D respectively of Figure 1.

Figure 6 shows the cross-sectional areas of the duct sections of Figures 2, 3, 4 and 5 superimposed.

Figure 7 is a development of a vane on the line X—Y of Figure 1.

Figure 8 is a development of one duct on the line X—Y of Figure 1.

Figures 9, 10, 11, 12, 13 show the cross-sectional area of the duct on the lines d—d, c—c, b—b, a—a and e—e of Figure 8, which correspond to the lines D—D, C—C, B—B, A—A and the outlet, respectively, of Figure 1.

Figure 14 shows the cross-sectional areas of the duct sections of Figures 9, 10, 11, 12 and 13 superimposed.

Figure 15 is a development of a vane having an extension at the inlet.

Figure 16 is a development of a duct between two vanes as shown in Figure 15.

In Figure 1, 1 is the pump impeller with which this invention is principally concerned, while 2 is the turbine and 3 is the reaction member. The mentioned turbine and reaction member both have vanes and are, of course, suitably enclosed in a casing (not shown) so as to form a working circuit for fluid, and only the essential parts forming the working circuit only are shown, while the connection of the pump impeller to the drive shaft of an engine or other prime mover and the connection of the turbine to the driven shaft are omitted for clarity in the drawings, since all such structure is well known in the art. When the impeller 1 is rotated by any prime mover, liquid flows therein by centrifugal action from the inlet 4 thereof to the outlet 5 thereof whence it is discharged into the inlet of the turbine through which it flows in a radially inwards direction imparting rotational movement thereto. The outlet is situated in the outer half of the circuit, i. e., on that side of the line B—B which is remote from the axis of rotation.

The outer and inner walls of the ducts in the impeller are formed by the members 9 and 10 and the side walls are formed by the vanes 11, 12. 7 and 8 are rivets securing these vanes to the members 9, 10.

At the inlet (Figure 5) the vanes are thin and the cross-sectional area of the ducts of the impeller is at a maximum. The thickness of the vanes is thereafter progressively increased as shown in Figures 4, 3 and 2 so as to maintain the walls of the ducts formed by the vanes 11 and 12 non-divergent, notwithstanding that the vanes are extending radially outwards from the axis of rotation. The walls 9 and 10 are progressively brought closer together to reduce the cross-sectional area, the height of the vanes being accordingly reduced. Figure 6 shows the successive cross-sections of the duct superimposed and it will be seen that the side walls remain the same distance apart while the top and bottom walls are converging. The vanes have been thickened as shown in Figure 7 from the point 13 at the inlet to the point 14 corresponding to the line A—A of Figure 1.

Thereafter from the point 14, the vane is turned backwards towards the outlet so that the thickness of the vane may be progressively reduced while the duct remains non-divergent as shown in Figure 8. In the embodiment illustrated, in the latter part of each duct, i. e., from the line a—a (Figure 8) to the outlet, the sides of the duct constituted by the vanes converge (the backwards turn being sufficient for this purpose notwithstanding the taper of the vanes) and the walls of the duct formed by the members 9 and 10 are maintained parallel for a short final axial length of duct, as shown on Fig. 1.

The vanes are progressively rounded as shown at 15 (Figure 4), 16 (Figure 3), and 17 (Figure 2) in order that the duct which is tetragonal at the inlet and the outlet may not have sharp corners throughout the greater part of its length. This accounts for the D-shaped cross-section of the outlet shown in Figure 13 on the line e—e of Figure 8. One side of the outlet is constituted by a part of a vane which is some distance from the tip and is still somewhat rounded, while the other side is constituted by the tip of a vane which has there ceased to be rounded.

The radius of curvature of the part 9 should not be more than about twice the radius of curvature of the part 10.

In order to avoid or decrease losses due to shock at the inlet, the latter is preferably disposed at a little distance from the discharge outlet of the member through which the liquid has passed previously to entering the impeller, and entrance members 19, 19' (Figures 7, 8, 15 and 16) are placed at or near the inlet in fixed relation to the vanes 11, 12, 11', 12' of the impeller. These entrance members are of bulbous formation as shown and are shaped so as rapidly to constrict the space through which the liquid must pass before entering the inlet, i. e., from 20 to 21, or 20' to 21', and thereafter to provide a gradual expansion of such space up to the inlet, which must, as pointed out previously, be relatively large in order to permit a progressive reduction of cross-sectional area throughout each duct of the impeller from the inlet 4 to the outlet 5. When the entrance members are not connected to the vanes, there are two such entrance members 19 disposed on each side of vane 12 if there is only one vane to be considered, but if there are two or more considered, there are just enough entrance members to have one disposed on each side of each of the vanes, those entrance members located between the vanes individually serving to cooperate with both adjacent vanes. On the other hand, when the entrance members 19' are directly connected to the vanes 11', or 12', there is obviously one entrance member to each vane, the net result being in all cases that when the vanes are repeated in an endless series about the axis of the pump impeller, an equal number of entrance members are also arranged in a similar endless series, whether connected to the vanes or not. Although the mentioned gradual expansion up to the inlet tends to introduce some eddying and turbulence, the total amount thereof is smaller than that which would result from shock in the absence of the members 19, 19' and of the initial constriction caused by the bulbous ends thereof as stated above.

The preferred form is shown in Figures 15 and 16 where the members 19' are formed as integral extensions of the vanes, but they may be offset as shown at 19 in Figures 7 and 8.

The present invention is a hydraulic variable-speed transmitter, the class and the novelty of which may be restated for purposes of definition as follows. It is of a kind with a driving impeller member and a driven turbine member, each comprising enclosing walls with interior duct-forming vanes, and the two being rotatable in a vis-à-vis relation about a common axis, with a permanent liquid mass confined to flow around a closed toroidal circuit or circuits, first outwardly with respect to the rotation axis, through the impeller ducts, and thence by discharge therefrom directed across with axial component to enter the turbine ducts and inwardly therein for recirculation. In the impeller the driving torque is converted into high velocity of liquid and thus is transmitted with high kinetic energy to deliver impinging thrusts upon the turbine vanes to generate a driven torque which is variable according to the respective rotary speeds and may exceed the driving torque. These class features in general are substantially known, and the transmitter hereof is characterized in the following, among other particular features. The enclosing walls and vanes of the impeller are of a form to define a series of ducts each of which throughout the major part of its length, or at least substantially from inlet to outlet, has a cross-sectional shape both dimensions of which, between the walls and between the vanes, respectively, are at least substantially as short as at every preceding point. In other words there is effective non-divergence in the full sense, with permissible convergence. Combined with this characteristic, of high operative importance, the outer portions of the impeller ducts as they approach their outlets are each curved progressively away from a radial plane, in a backward manner, to a substantial angular extent, thereby to cause adjacent non-diverging ducts mutually to approach and substantially meet for smooth confluence of the angularly issuing streams. The important result of this combination of features, in a transmitter of the kind recited, is that the impeller ducts throughout the path of liquid flow therein are each free of eddy-producing divergence, so that the liquid travels steadily therethrough and issues from the series of outlets as a high velocity continuous annular stream having axial and whirling components and without excessive turbulence, thereby to be received smoothly in the turbine ducts for effective delivery of torque thrusts on the turbine vanes and to promote continued stability of flow throughout the entire toroidal path of the liquid. Preferably, substantially from inlet to outlet of each duct, at least one of the aforesaid two sectional dimensions actually shortens progressively, so that in its sectional area each duct grows progressively smaller, affording actual convergence to a reduced outlet. Preferably the impeller and turbine are both curved in an arched or C-shape, axially from each other, so that the impeller outlet and the turbine inlet are directed vis-à-vis toward each other at the radially outermost portion of the toroidal circuit; in connection with which general arrangement each of the impeller vanes from inlet to outlet first extends outwardly in a substantially radial plane while flaring or shaped progressively thicker, thereby to produce non-divergence or convergence of duct, but therebeyond is shaped progressively thinner as it extends along its backward curvature, which curvature continues through an angle sufficient to prolong to the end the non-divergence of the duct and to afford smooth confluence of the adjacently issuing streams.

In classing this invention as a power transmission apparatus it is intended to designate it as of its real and practical character and utility, adapting it per se to serve as a complete drive (e. g., for automobiles) such as can and does give a torque increase from the impeller to turbine under certain driving conditions, wherein the reaction means or reactor functions importantly. Thus, with this invention, both the driven speed and torque are variable, and under reduced or zero speed driving conditions the driven torque effectively exceeds the driving torque; so that a maximum torque increase is afforded at starting, and at reduced speed an enhanced torque is available to overcome high load (such as uphill) conditions. These characterizations distinguish the transmitter hereof from a mere hydraulic coupling such as has been proposed in various forms.

While the central and other general parts of the disclosed apparatus are not illustrated in the drawings hereof, they will be understood to include driving, driven and stationary members, at or concentric with the axis, and connected respectively with the impeller, the turbine and the reactor, in accordance with the structural principles generally indicated in applicant's prior Patent No. 2,173,428, of September 19, 1939, or his British Patent No. 456,277, of 1935; or more particularly as shown in detail in applicant's companion application, Serial No. 231,869, filed September 27, 1938, to which reference may be made for the structure of the general and central parts not herein illustrated.

What I claim and desire to secure by Letters Patent of the United States is:

1. A hydraulic power transmitter of the kind comprising a vaned pump impeller, a vaned turbine and a vaned reaction member, the impeller driving the turbine by means of a liquid circulating in a closed circuit about the center of the circuit and also circumferentially and in which the torque imparted by the hydraulic means to the turbine is or can be substantially greater than that imparted to the impeller whereby transmission of power may be effected in a forward direction by hydraulic means at a torque ratio or ratios substantially greater than the ratio of 1 to 1 independently of any associated mechanical change speed gearing; the said impeller comprising ducts which form part of the circuit and which from their inlet ends are substantially radially disposed towards the outer parts where the ducts are turned backwardly relatively to the direction of rotation of the impeller, which ducts considered individually are formed by opposite pairs of enclosing walls and have at least along a substantial part of each duct including both the radial part and the backwardly turned part, a formation due to the relation of the walls, wherein any normal cross-section of the duct can be superimposed upon every normal cross-section thereof which is more remote than itself from the duct outlet without overlapping the same, namely, by reason of the walls of each wall pair being spaced apart at every point of the duct length by a distance which is at least as short as at every preceding point thereof, so as to produce a fully nondivergent duct formation which creates streamline or stable flow of the liquid and causes the liquid to be issued as an annular streamline or stable jet which is delivered to the turbine free from shock to enable the streamline flow to continue through the turbine and the reaction member and throughout the circuit; and wherein the impeller vanes, where they turn backwardly are reduced in thickness to form thin edges thereby to provide duct outlets which closely adjoin for smooth mergence of the issuing streams.

2. A hydraulic power transmitter of the kind comprising a vaned pump impeller, a vaned turbine and a vaned reaction member, the impeller driving the turbine by means of a liquid circulating in a closed circuit about the center of the circuit and also circumferentially and in which the torque imparted by the hydraulic means to the turbine is or can be substantially greater than that imparted to the impeller whereby transmission of power may be effected in a forward direction by hydraulic means at a torque ratio or ratios substantially greater than the ratio of 1 to 1 independently of any associated mechanical change speed gearing, the said impeller comprising between inner and outer shells vanes which are substantially radially disposed and are increased in thickness on each side of their center lines from adjacent the inlet ends to produce in conjunction with the inner and outer shells a non-divergent duct or passage, which vanes from the point where the thickness is at the maximum, are turned backwardly relatively to the direction of rotation of the impeller and from this point are decreased in thickness to continue the non-divergence of the passage; the non-divergence of duct being in both dimensions thereof by reason of the spacing of the shells and of the vanes at every point being at least as small as at every preceding point along the length of the duct; and combined therewith a series of auxiliary vane members in proximity to the inlets of the ducts of the impeller and shaped with bulbous heads to diminish eddying or turbulence in the region of the said inlets, which ends assist in maintaining throughout the closed circuit the streamline flow created by the impeller ducts by the non-divergent formation of its ducts.

3. A hydraulic variable-speed power transmitter of the kind having a driving impeller member and a driven turbine member each comprising enclosing annular walls with interior duct-forming vanes and the two rotatable in vis-à-vis relation about a common axis, with a liquid mass confined to flow around a closed toroidal circuit first outwardly with respect to the rotation axis through the impeller ducts and thence by discharge therefrom with axial component directed to enter the turbine ducts and inwardly therein for recirculation, and with a reaction means interposed in such circuit between the turbine and impeller, whereby under reduced and zero driven speed conditions the driven torque exceeds the driving torque; characterized in that the enclosing walls and vanes of the impeller are of form to define a series of ducts each of which at every point substantially from inlet to outlet has a cross-sectional shape both dimensions of which between walls and between vanes respectively are each at least as short as at every preceding point; and the outer portions of such ducts being each curved progressively away from a radial plane to an angle to cause adjacent non-diverging ducts mutually to approach and substantially meet at their outlets for smooth confluence of the angularly issuing streams; whereby the liquid travels steadily through the impeller ducts and issues as an annular stream to be received smoothly in the turbine ducts for delivery of torque to the turbine and continuance of stability of flow throughout the toroidal path of the liquid.

4. A transmitter as in claim 3 and wherein, substantially from inlet to outlet, at least one of the aforesaid two sectional dimensions of each non-diverging impeller duct actually shortens progressively, whereby the sectional area of duct is progressively smaller affording duct convergence to a reduced outlet.

5. A transmitter as in claim 3 and wherein the walled impeller and turbine are curvedly arched axially from each other whereby the impeller outlet and turbine inlet are directed vis-à-vis toward each other at the radially outermost part of the toroidal circuit; and each of the impeller vanes from inlet to outlet first extends outwardly in a substantially radial plane while shaped progressively thicker thereby to produce non-divergence of duct, but therebeyond is shaped progressively thinner while being curved backwardly from its radial disposition through an angle sufficient to continue non-divergence and afford smooth confluence of adjacently issuing streams.

6. A hydraulic variable-speed power transmitter of the kind having a driving impeller member and a driven turbine member each comprising enclosing annular walls with interior duct-forming vanes and the two rotatable in vis-à-vis relation about a common axis, with a liquid mass confined to flow around a toroidal circuit first outwardly with respect to the rotation axis through the impeller ducts and thence by discharge therefrom with axial component to enter the turbine ducts and inwardly therein for recirculation, and with a reaction means interposed in such circuit between the turbine and impeller, whereby under reduced and zero driven speed conditions the driven torque exceeds the driving torque; characterized in that the enclosing walls and vanes of the impeller are of form to define a series of ducts each of which at every point substantially from inlet to outlet has a cross-sectional shape both dimensions of which between walls and between vanes respectively are each at least as short as at every preceding point; and the outer portions of such ducts being each curved progressively away from a radial plane to an angle to cause adjacent non-diverging ducts mutually to approach and substantially meet at their outlets for smooth confluence of the angularly issuing streams; and characterized further in that, at positions adjacent to the impeller duct inlets, are auxiliary vanes shaped with bulbous heads and tapered tails and thereby adapted to minimize tendency of eddying in the liquid stream; whereby the liquid travels steadily through the impeller ducts and issues as an annular stream to be received smoothly in the turbine ducts for delivery of torque to the turbine and continuance of stability of flow throughout the toroidal path of the liquid.

PIERO MARIANO SALERNI.